UNITED STATES PATENT OFFICE.

MAXIMILIAN ZINGLER, OF 19 BUCKLAND CRESCENT, BELSIZE PARK, ENGLAND.

IMPROVEMENT IN VARNISHES.

Specification forming part of Letters Patent No. 163,041, dated May 11, 1875; application filed September 24, 1874.

*To all whom it may concern:*

Be it known that I, MAXIMILIAN ZINGLER, of 19 Buckland Crescent, Belsize Park, in the county of Middlesex, England, a naturalized subject of the Queen of Great Britain, have invented or discovered new and useful Improvements in the Manufacture of Varnish; and I, the said MAXIMILIAN ZINGLER, do hereby declare the nature of the said invention, and in what manner the same is to be performed, to be particularly described and ascertained in and by the following statement thereof—that is to say:

This invention has for its object the dissolution of copal and other hard gums without the necessity for the employment of heat or rectified spirits of wine.

For this purpose I dissolve copal and other hard gums heretofore used in varnish-making (or other gums which may advantageously be used with my invention, and which are not generally used under the present system) by means of a compound liquid, which compound liquid is composed of bisulphide of carbon, together with camphine or turpentine, benzole, or rectified petroleum and methylated spirits.

The solution of the gums and the manufacture of varnish are effected without using heat or overproof spirits of wine.

The addition of camphor facilitates the solution of the gums, but it is not essential.

By these means I am able to produce a better, more durable, and cheaper varnish than is at present manufactured.

In order to make the varnish, I, in the first place, make a compound liquid, consisting of the following solvents, viz: bisulphide of carbon, one part; camphine or turpentine, one part; benzole or rectified petroleum, one part; methylated spirits, two parts.

I mix these solvents in a closed vessel until all the ingredients are thoroughly amalgamated and appear clear to the eye. This compound is then fit for use, but the thorough amalgamation of the ingredients takes more or less time, according as the same are agitated in the said vessel. The compound, when fit for use, remains good when kept in closed vessels for an indefinite time. I then take so much copal or other hard gum heretofore used for varnish-making (or other gums which may be used with my invention, and which are not generally used under the present system) according to the nature of the varnish I wish to make, and, by pounding the same, I reduce it to a fine powder. Then, in a vessel provided, by preference, with an agitator, I mix the solvents with the powdered gum.

For every one hundred pounds of gum I use two hundred to two hundred and fifty, and even three hundred, pounds of the mixed solvents, and even more, if necessary.

These quantities depend on the hardness of the gums used and on the consistency of the varnish required.

I then thoroughly mix up all the ingredients until the gum is dissolved, a process which, in ordinary circumstances, is completed in less than one hour.

In mixing the solution with the powdered gum I prefer to employ closed vessels, in order that the spirit used in the compound liquid should not evaporate.

I allow this mixture to settle for a few days, when I pour it off into suitable vessels, taking care that any dirt or sediment which has settled at the bottom of the vessel does not mix with the liquid so poured off; or, if so desired, this liquid so poured off can be filtered.

This liquid so poured off is varnish, which can be used for all purposes for which varnish is used.

I can also mix it with oil or other oleaginous substances, or other ingredients, so as to regulate the drying of the varnish when used.

Coloring matters may also be added, if desired.

When employing gums which are difficult to dissolve, such as Zanzibar copal, I add camphor or spirits of camphor to the solvents in proportion, by preference, not exceeding ten per cent. of the gum to be dissolved.

Although I prefer to employ a mixture of four solvent liquids, as above set forth, nevertheless it is not essential; but it is essential that the bisulphide of carbon should be used in conjunction with either camphine or turpentine, or with methylated spirit; and, to obtain a good result, benzole or rectified petroleum is also requisite.

Having described the nature of the invention, and the manner of performing the same, I declare that what I claim as my invention is—

A varnish consisting of powdered gum, bisulphide of carbon, camphine, benzole, and methylated spirits, substantially as and in the proportions specified.

M. ZINGLER.

Witnesses:
 WILMER M. HARRIS,
 THOMAS LAKE,
  *Both of No. 17 Gracechurch street.*